United States Patent
Fledderjohn

[11] Patent Number: 5,226,788
[45] Date of Patent: Jul. 13, 1993

[54] TURBINE HEAT SHIELD AND BOLT RETAINER ASSEMBLY

[75] Inventor: Steve R. Fledderjohn, Cincinnati, Ohio

[73] Assignee: General Electric Company, Cincinnati, Ohio

[21] Appl. No.: 812,476

[22] Filed: Dec. 23, 1991

[51] Int. Cl.$^5$ .................. F01D 25/24; F16B 39/28
[52] U.S. Cl. ..................... 415/177; 411/84; 411/85; 411/966
[58] Field of Search ............ 415/177, 178, 180, 214.1; 411/169, 399, 910, 966, 84, 85

[56] References Cited

U.S. PATENT DOCUMENTS

| | | | |
|---|---|---|---|
| 3,688,371 | 9/1972 | Koff | 416/198 A |
| 3,823,553 | 7/1974 | Smith | 60/39.16 |
| 3,842,595 | 10/1974 | Smith et al. | 60/39.36 |
| 4,064,691 | 12/1977 | Nash | 60/39.06 |
| 4,190,397 | 2/1980 | Schilling et al. | 415/214.1 |
| 4,309,145 | 1/1982 | Viola | 415/180 |
| 4,320,903 | 3/1982 | Ayache et al. | 415/180 |
| 4,397,471 | 8/1983 | Feldman et al. | 277/27 |
| 4,843,825 | 7/1989 | Clark | 60/756 |
| 4,887,949 | 12/1989 | Dimmick, III | 411/121 |
| 4,987,736 | 1/1991 | Clokajlo | 60/39.36 |
| 4,997,328 | 3/1991 | Vidila et al. | 411/169 |
| 5,052,891 | 10/1991 | Burkholder | 416/198 A |
| 5,118,253 | 6/1992 | Balkcum, III | 415/209.2 |

*Primary Examiner*—Edward K. Look
*Assistant Examiner*—Michael S. Lee
*Attorney, Agent, or Firm*—Jerome C. Squillaro

[57] ABSTRACT

The present invention provides an annular integral bolt heat shield and axial retention apparatus to axially retain bolts used for holding together two rotor elements during assembly when the bolts are otherwise subject to sliding into a closed cavity of the assembled engine or one of its modules. The integral retainer and heat shield engage the bolts disposed through bolt holes in a gas turbine engine rotor shaft so that the bolts remain straight during assembly when a second rotor element such as a second shaft is being attached to the first shaft and bolt holes in the second shaft have to engage and fit over the bolts of the first shaft. One particular embodiment of the present invention provides a low pressure turbine rotor shaft assembly of a low pressure turbine module wherein forward and aft shafts are attached by bolts which have bolt heads in a closed cavity of the module and are slidably disposed through corresponding bolt holes of each shaft such that the bolt heads are disposed aft of the aft shaft. An integral heat shield and axial bolt retainer is mounted to the aft shaft aft of the bolt heads so as to trap and retain the bolt heads between the shield and the aft shaft.

7 Claims, 4 Drawing Sheets

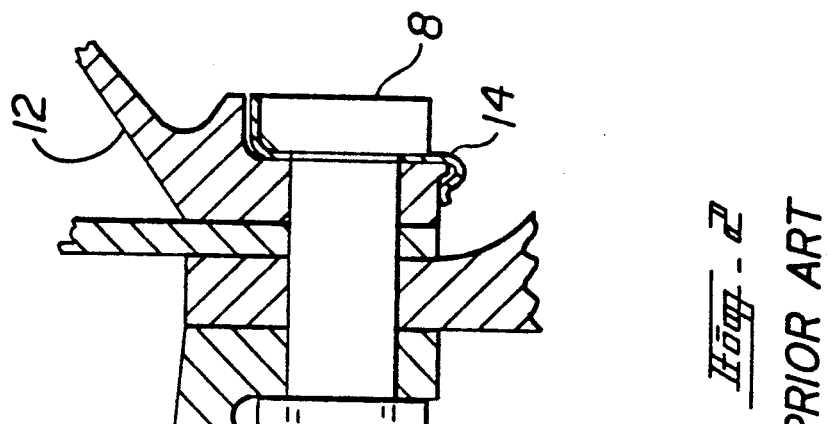
_Fig. 1_
PRIOR ART
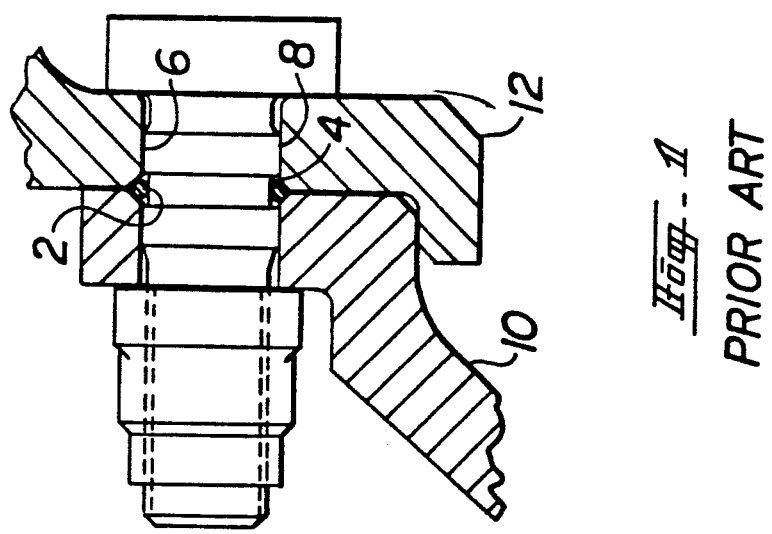
_Fig. 2_
PRIOR ART

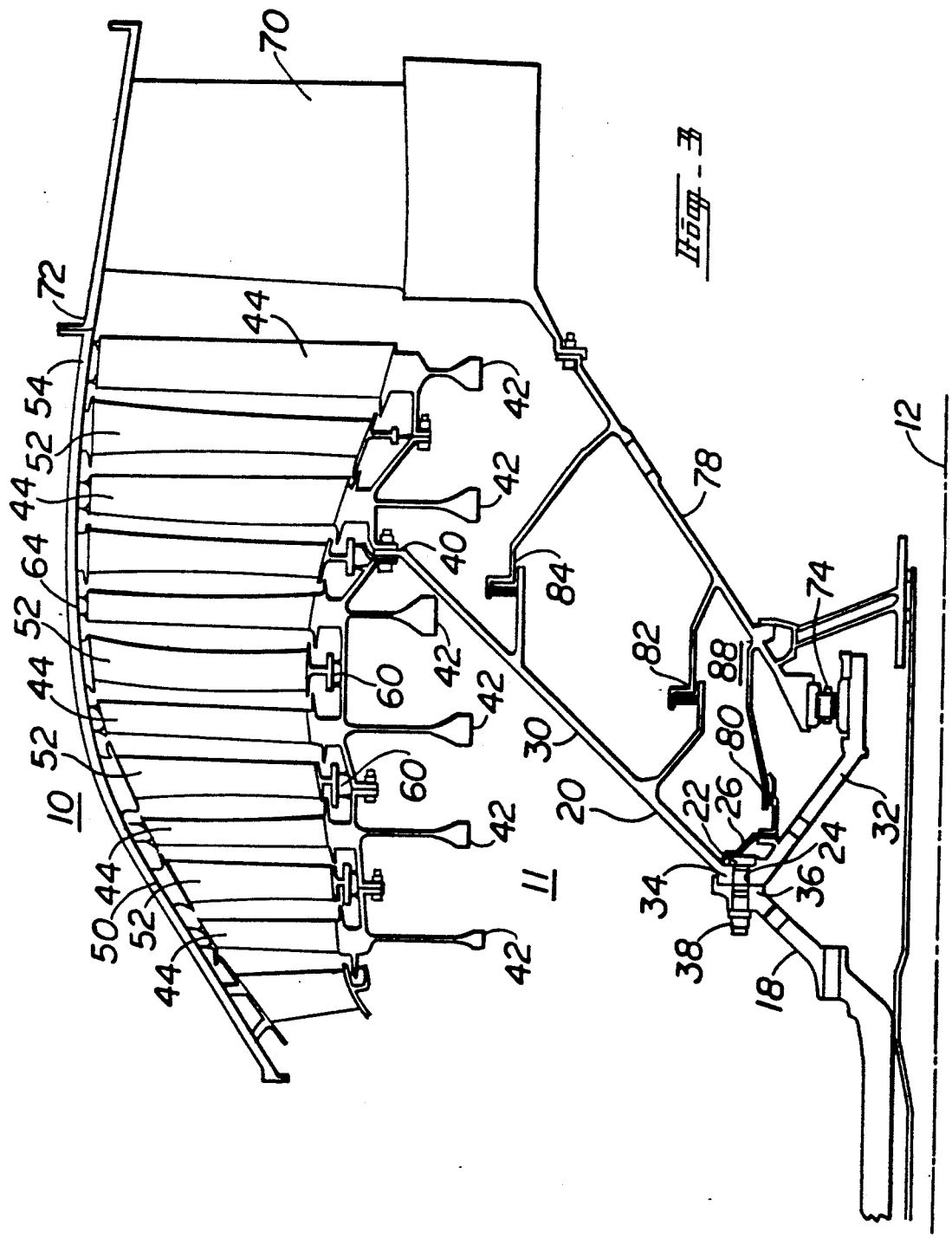

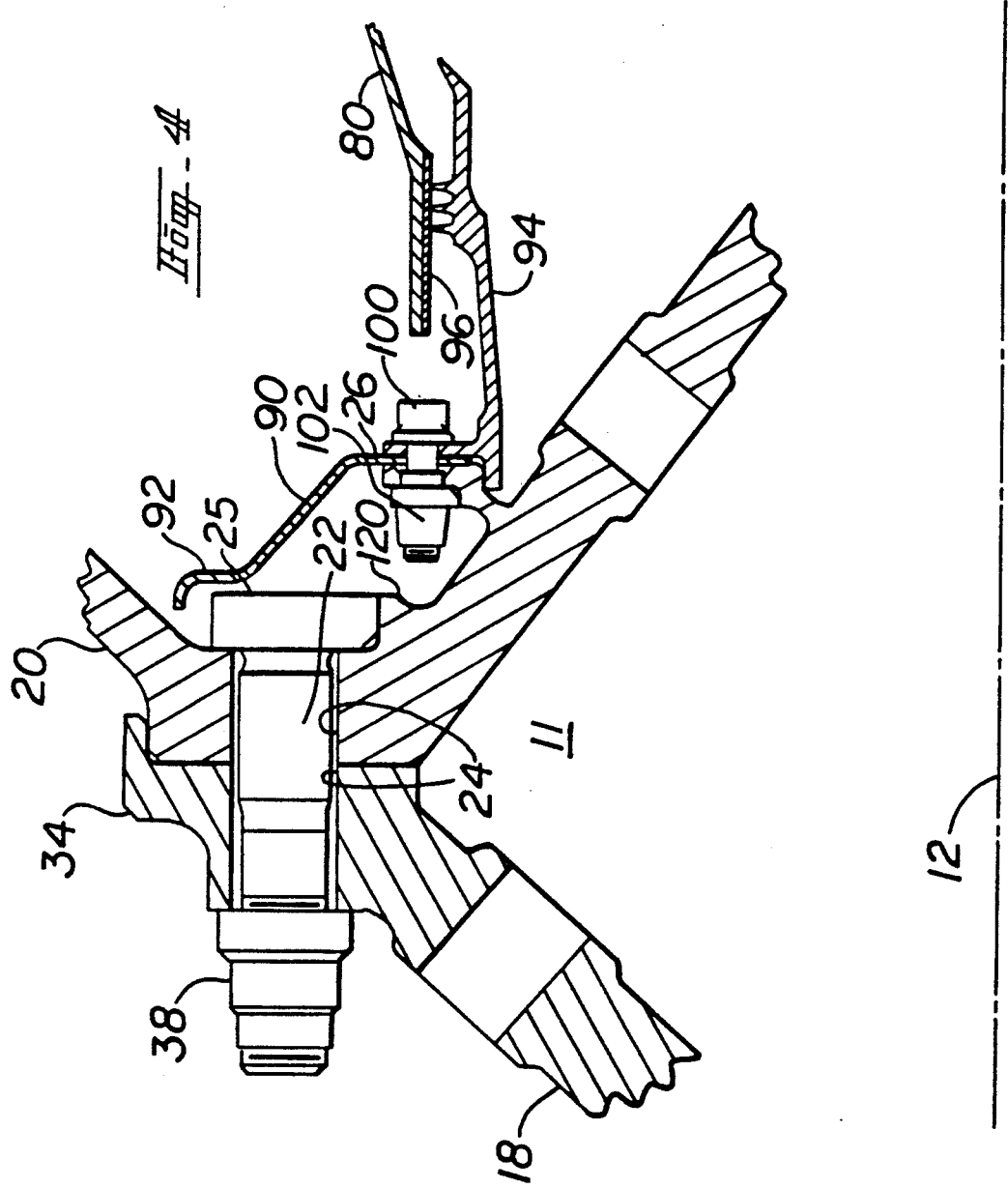

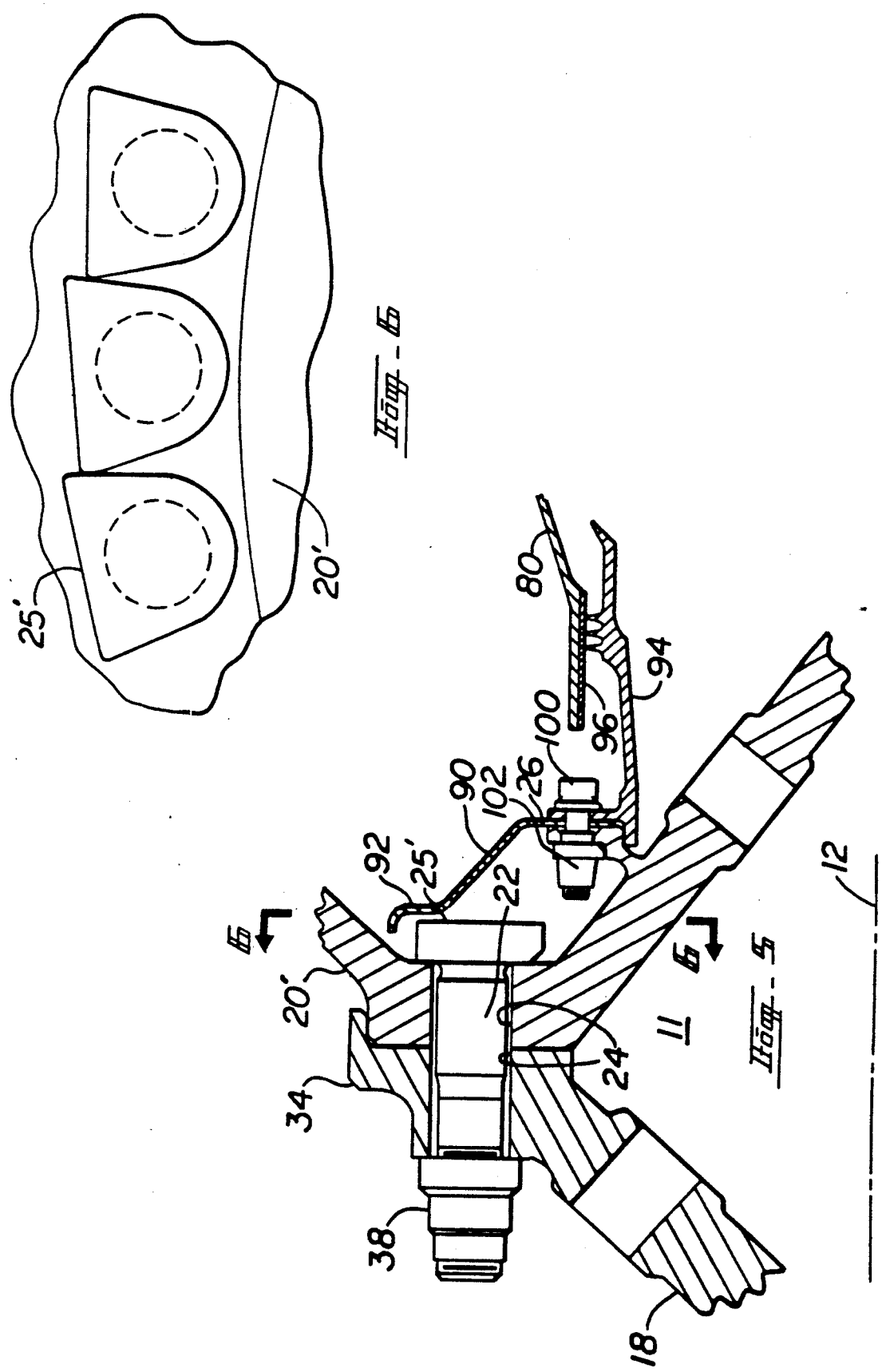

TURBINE HEAT SHIELD AND BOLT RETAINER ASSEMBLY

BACKGROUND OF THE INVENTION

1. Field of the Invention

This invention relates to gas turbine engine rotor attachment and particularly to heat shields and axial retention for bolts used to connect turbine shafts.

2. Description of Related Art

Gas turbine engines conventionally transfer rotational mechanical energy from turbine sections of the engine to the fan and compressor sections via shaft assemblies that are bolted together for easy assembly and disassembly. Ease of assembly and disassembly provides many benefits from a cost standpoint and enhance modular designs which have been developed to help ship and install gas turbine engines. Examples of such modular engines are disclosed in U.S. Pat. No. 3,842,595 entitled "Modular Gas Turbine Engine" by Smith et al and in U.S. Pat. No. 3,823,553 entitled "Gas Turbine With Selfcontained Power Turbine Module" by Smith, both assigned to the same assignee as the present invention.

Due to the large size of modern high bypass ratio fanjet engines, and particularly their fan sections, it has become useful to incorporate modularity into engine designs. Modularity enhances the engine's assembly and disassembly and facilitates shipment of the engine and its part for original installation, overhaul, repairs, and retrofitting.

Bolt assemblies to secure shaft sections for the low pressure turbine are often not accessible from the low pressure turbine are often not accessible from the rear during assembly. Axial bolt retention means are required during assembly because such bolt heads lie in closed cavities. Heat shielding the bolts from the hot gases passing through rear stages of the low pressure turbine is also highly desirable if not often required to prolong the useful life of the assembly and increase engine reliability.

Prior engine designs such as the one illustrated in FIG. 1 have incorporated split ring retainers 2 disposed in circumferential grooves 4 formed in the shank 6 of and to retain the bolt 8 which is used to attach a forward rotor element 10 to an aft rotor element 12. Another prior art design is illustrated in FIG. 2, and uses an individual bolt hook 14 to retain the bolt 8 which attaches forward rotor element 10 to aft rotor element 12. Yet another apparatus shown in the prior art is a retention clip disclosed in U.S. Pat. No. 4,887,949 entitled "Bolt Retention Apparatus" by Dimmick, III et al. All of these designs add weight, increase the number of engine parts, and increase the complexity of the engine and assembly and disassembly procedures. Circumferential grooves reduce the shanks load carrying capability and split rings and clips are subject to and may also introduce undesirable engine vibrations.

SUMMARY OF THE INVENTION

The present invention provides a bolt head shield and axial retention apparatus to axially retain bolts used for holding together two engine elements during assembly when the bolts are otherwise subject to sliding into a closed cavity of the assembled engine or one of its modules.

The preferred embodiment of the invention provides a one piece annular heat shield for a bolted assembly attaching two rotor elements together wherein the bolts are thermally shielded by the heat shield and the heat shield is mounted to a first one of the rotor elements so as to trap and retain the bolt heads between the shield and first rotor element.

One particular embodiment of the present invention provides a low pressure turbine rotor shaft assembly of a low pressure turbine module wherein forward and aft shafts are attached by bolts which are slidably disposed through corresponding bolt holes of each shaft such that the bolt heads are disposed aft of the aft shaft. An annular heat shield is mounted to the aft shaft aft of the bolt heads so as to trap and retain the bolt heads between the shield and the aft shaft.

ADVANTAGES

The present invention provides axial bolt retention without any additional parts beyond those of the heat shield apparatus with which it is integral. It provides ease of assembly, disassembly, and helps prevent misassembly of the bolted construction and low pressure turbine module. The present invention provides improved bolt retention while eliminating many small parts that are subject to vibration and vibrational stress in the engine.

BRIEF DESCRIPTION OF THE DRAWINGS

The foregoing aspects and other features of the invention are explained in the following description, taken in connection with the accompanying drawing where:

FIG. 1 is a cross-sectional view of a prior art split ring bolt retention means.

FIG. 2 is a cross-sectional view of a prior art hook bolt retention means.

FIG. 3 is a cross-sectional view of a portion of a modular fan-jet engine including an integral heat shield and bolt retention means in accordance with the preferred embodiment of the present invention.

FIG. 4 is an exploded cross-sectional view of the shaft attachment apparatus in FIG. 3 showing in more detail the integral heat shield and bolt retention apparatus.

FIG. 5 is an exploded cross-sectional view of the shaft attachment apparatus in FIG. 3 showing an alternate embodiment of a bolt anti-rotation means.

FIG. 6 is an aft view of the bolt anti-rotation means shown in FIG. 5.

DETAILED DESCRIPTION OF THE INVENTION

This invention is particular but not limited to a high bypass fan-jet gas turbine engine exemplified by the CFM, CF6, and BE90 series of engines by General Electric, the assignee of this patent application. Illustrated in FIG. 3, is a low pressure turbine (LPT) section 10 of a fan-jet gas turbine engine (not shown in its entirety) having a low pressure rotor (LPR) assembly generally shown at 11 circumferentially disposed about engine centerline 12. LPR assembly 11 includes two LPR shafts, a forward shaft 18 and an aft shaft 20 attached to each other by bolts 22 which are retained in place disposed in aft shaft bolt holes 24 during assembly by an integral heat shield and axial bolt retainer 26 mounted to aft shaft 20 in accordance with the preferred embodiment of the present invention.

Aft shaft 20 has a generally aft opening conical web 30 attached to a generally aft closing conical hub 32 at a flange like rim 34. Forward shaft 18 includes an aft flange 36 which is bolted to rim 34 by bolts 22 and corresponding nuts 38. Web 30 at its radial outer periphery 40 is bolted to it a series of LPT disks 42 which support radially outwardly extending LPT blades 44. Inter-dispersed between LPT blades 44 are stator assemblies 50 including LPT stator vanes 52 depending radially inward from an LPT casing 54. LPT stator vanes 52 are in rotational sealing engagement with LPT rotor 11 at stator seal 60 and LPT blades 44 are in rotational sealing engagement with casing 54 at rotor blade seal 64.

A LPT frame 70 attached to casing 54 at its radially outward end 72 rotationally supports LPT shaft 20 by way of an LPT bearing assembly 74. LPR frame 70 includes a conical web like strut 78 and which is in rotational sealing engagement with web 30 of aft shaft 20 using inner, intermediate, and outer seal assemblies 80, 82 and 84 respectively. For modular construction, as well as other types, LPR assembly 11 is set into LPT frame 70 with aft shaft 20 not attached to forward shaft 18. Bolts 22 are, however set in their respective bolt holes 24 held in place by integral heat shield and retainer 26 so that they will not fall into cavity 88 during assembly and disassembly of forward shaft 18 to aft shaft 20.

Referring to FIG. 4, forward shaft 18 is attached to aft shaft 20 attached by bolts 22 which are retained in place disposed in aft shaft bolt holes 24 during assembly by a one piece annular integral heat shield and axial bolt retainer 26 mounted to aft shaft 20 by a second set of bolts 100 and nuts 102. In accordance with the preferred embodiment of the present invention second set of bolts 100 and nuts 102 also attaches a rotatable inner knife edge seal 94, which seals against a seal land 96 of inner seal assembly 80, to rotor assembly 11. Alternatively integral heat shield and axial bolt retainer 26 may also be a one piece integral element together with inner knife edge seal 94.

Integral heat shield and axial bolt retainer 26 includes a conically shaped shield portion 90 having an outer inverted L shaped retainer portion 92. Shield portion 90 is spaced sufficiently apart from bolts 22 so as to provide thermal protection for the bolts.

Retainer portion 92 is spaced apart from bolts 22 so as to provide axial retention of the bolts in holes 24 of aft shaft 22 and may be used to keep the bolts horizontal so that during assembly forward shaft 18 and its bolt holes 24 can be easily aligned and mated to the aft shaft. One particular embodiment of the present invention provides an anti-rotation rim 120 formed on aft shaft 20 so as to engage a bolt head 25 of bolt 22 along a flat of the head which prevents bolts 22 from turning when nuts 38 are torqued and also helps keep bolts 22 horizontal, essentially parallel to centerline 12.

Another embodiment shown in FIGS. 5 and 6 does not use an anti-rotation rim on aft shaft 20, but rather provides anti-rotation bolt heads 25'. As shown in FIG. 6 adjacent anti-rotation bolt heads 25' are shaped and circumferentially spaced apart such that they interfere with each other to prevent bolts 22 from rotating when nuts 38 are being torqued.

While the preferred and alternate embodiments of the present invention has been described fully in order to explain its principles, it is understood that various modifications or alterations may be made to the preferred embodiment without departing from the scope of the invention as set forth in the appended claims.

We claim:

1. A bolt retention and shield apparatus for thermal protection and axial retention of bolts in gas turbine engine rotor bolt holes, said bolt retention and shield apparatus comprising:
   an annular heat shield,
   a retention means for axial retaining the bolts in the bolt holes at one end of said shield, and
   a means to mount said heat shield to the rotor at another station of said heat shield.

2. A bolt retention and shield apparatus as claimed in claim 1 wherein said mounting means station of said heat shield is at another end of said shield.

3. A bolt retention and shield apparatus as claimed in claim 1 further comprising a rotatable air seal extending from said heat shield.

4. A gas turbine engine rotor attachment assembly comprising:
   a first rotor element having a circumferential plurality of bolt holes disposed therethrough,
   a plurality of bolts having bolt heads facing a first axial direction disposed through said plurality of bolt holes,
   an integral bolt retainer and heat shield means attached to said first rotor element spaced apart from said plurality of bolts and operable for thermal protection and axial retention of said plurality of bolts in said plurality of bolt holes.

5. A gas turbine engine rotor attachment assembly comprising:
   a first rotor element having a circumferential plurality of bolt holes disposed therethrough,
   a plurality of bolts having bolt heads facing a first axial direction disposed through said plurality of bolt holes,
   an integral bolt retainer and heat shield means attached to said first rotor element for thermal protection and axial retention of said plurality of bolts in said plurality of bolt holes, and
   an annular rim formed in and shield so as to engage flats on said plurality of said bolt heads to prevent said bolt heads from turning during their nut torquing procedure and said integral bolt retainer and heat shield means formed to axially retain said bolt head flats in engagement with said rim.

6. A gas turbine engine rotor attachment assembly as claimed in claim 5 further comprising a rotatable air seal extending from said heat shield.

7. A gas turbine engine section comprising:
   a casing having rows of stator vanes depending radially inward therefrom,
   a rotor having rotor blades interdigitated with said vanes,
   a frame mounted to said casing and at least partially rotatably supporting said rotor with a bearing assembly,
   an essentially closed cavity formed between said frame and said rotor,
   a circumferential plurality of bolt holes angularly disposed through said rotor,
   a plurality of bolts having bolt heads facing a first axial direction disposed through said plurality of bolt holes,
   an integral bolt retainer and heat shield means attached to said rotor spaced apart from said plurality of bolts and operable for thermal protection and axial retention of said plurality of bolts in said plurality of bolt holes.

* * * * *